Patented Dec. 27, 1927.

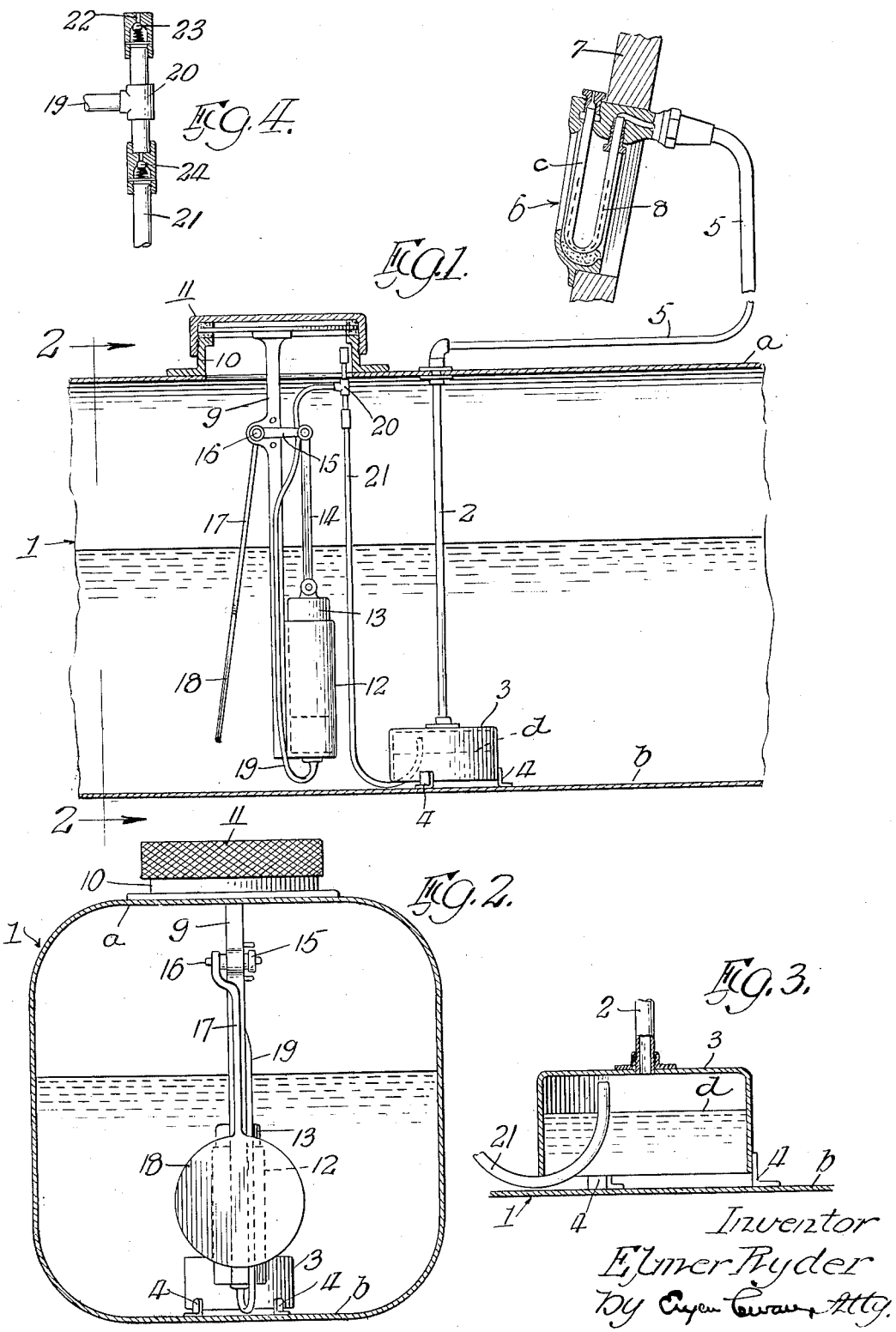

1,653,666

UNITED STATES PATENT OFFICE.

ELMER RYDER, OF BERWYN, ILLINOIS.

LIQUID-LEVEL GAUGE.

Application filed May 28, 1923. Serial No. 641,874.

This invention relates to means for automatically replenishing air to the air column of a liquid fuel gauge operated by compression of said column by the liquid in the tank to compensate for air leakage and changes in said column by expansion and contraction due to heat and cold, so that the gauge may register accurately the amount of liquid in the tank under such conditions.
The invention has for one of its objects the provision of this means in the form of a pump device, which may be located in the tank and operated by the wash of liquid caused by the tilt or jar of the motor vehicle in its travel over a roadway.

Another object of the invention is to provide a device which will not only be simple in construction and operation, but one that will be compact and capable of being inserted into and removed from the tank through the usual neck provided at the place for the ordinary gasoline gauge of the float kind.

The invention consists further in the matters hereinafter described and more particularly set forth in the appended claims.

In the accompanying drawings—

Fig. 1 is a vertical sectional view showing a device of my invention applied to a liquid fuel tank of an automobile or other motor vehicle;

Fig. 2 is a vertical sectional view taken on line 2—2 of Fig. 1;

Fig. 3 is an enlarged view showing the cup within and supported on the bottom of the tank and the manner in which the air inlet pipe of my device enters the same; and Fig. 4 is a detail of the check valves.

In the drawings, 1 indicates a liquid fuel tank, such as used on an automobile. 2 is a pipe extending downward into the tank through the top wall $a$ thereof and having its lower end opening into an inverted cup or like casing 3 supported above the bottom wall $b$ of the tank by brackets or other means 4. The pipe 2 joins a pipe 5, which leads to a gauge device 6 on the instrument-board 7 of the car. This gauge device may take any desired form, but as shown in Fig. 1 it is in the shape of a U-tube $c$ in which is a column of mercury 8.

The cup or casing 3 fills from below to a level $d$ short of its top wall, as shown. The pipes 2 and 5 constitute a conduit from the level $d$ and the mercury 8 and confine a column of air between such parts. The upward pressure on this air column by the liquid in the cup 3 varies as the height of the liquid column between it and the level in the tank 1 changes. This variation of pressure is registered by the gauge 6, and thus indicates on the board 7 the amount of fuel in the tank 1.

Due to leakage of air from the conduit 2—5, the level of the liquid in the cup 3 tends to raise and seek that of the fuel in the tank. When that happens the gauge becomes inoperative. Moreover, heat and cold affect the accuracy of the gauge in that heat expands the column of air in the conduit, while cold contracts it. When it is remembered that this conduit in most installations is close to the exhaust pipe, it will be seen that the opportunity afforded for varying the temperature of the air column is marked. This varies the pressure on this column and makes the gauge 6 register inaccurately the amount of fuel in the tank 1.

To overcome these objections, I provide means for automatically replenishing air to said conduit to compensate for changes therein. This means, as shown in the drawings, is in the form of a pump device. It comprises a support or bracket 9 extending downward into the tank 1 through the neck 10, where the usual float indicator is employed. A cap 11 closes the neck 10 and holds the bracket in place. The bracket 9 extends toward the bottom of the tank and carries a cylinder 12 closed at its lower end but open at its upper end to receive a plunger or piston 13. This is loose in the cylinder and is connected by a link 14 with a rock arm 15 pivoted to the bracket 9 by a pin 16. Also connected with this pin is an arm 17 extending downward toward the bottom of the tank 1 and provided with a wide paddle portion 18, as shown.

Opening into the bottom of the cylinder 12 is a pipe 19, which extends up along the bracket 9 toward the neck 10 and there by a T or other fitting 20 is connected with a pipe 21 with its upper end in said neck 10. The upper end of this pipe 21 opens to the atmosphere to provide an air intake 22 controlled by a spring pressed check valve 23, as shown in Fig. 4. Said pipe 21 extends toward the bottom of the tank 1 and has its lower end entering the inverted cup 3 from below and rising above the level $d$ of the fuel therein as shown in dotted lines in Fig. 1 and full lines in Fig. 3. In the pipe 21 below the fitting 20 is another spring pressed check valve 24, as shown in Fig. 4.

The device of my invention operates as follows. The paddle 18 is arranged transverse to the length of the tank 1 and thus is in the path of the wash as the liquid in the tank surges back and forth due to the tilt or jar of a car in passing over a roadway. A swinging movement is thus imparted to the paddle 18, which through the arm 17 and links 15 and 14 reciprocates the plunger 13 up and down in its cylinder 12. This cylinder 12 being immersed in the liquid in the tank 1 and open at its upper end allows liquid to fill the space in the cylinder not occupied by the plunger 13 and also the pipe 19 to the same level as in the tank 1. As the plunger 13 is reciprocated, a surge is created in the pipe 19. The check valve 23 opens on the downward surge and air is drawn into the pipe 21 past said valve. On the upper surge in the pipe 19, this indrawn air is forced past the other check valve 24 and into the conduit 2—5, thus replenishing air in the air column in said conduit. The operation described is repeated as long as the pump is actuated and replenishing of air to this column automatically effected.

With this resupply of small amounts of air from time to time to the air column, the amount of air in the same is more or less maintained constant with the result that the gauge 6 operates substantially accurate under the conditions heretofore described and thus properly registers the amount of fuel in the tank 1. Moreover, no opportunity is afforded for the air in the air column to be so reduced as to allow the gauge to become inoperative as heretofore.

While I have shown and described in detail herein a device of my invention as applied to pumping air into the pipe line of a gasoline gauge of the so-called pressure type, it is to be of course understood that my device may be utilized in connection with other gauges, particularly the gauge shown in my copending application Serial No. 578,311, filed July 29, 1922, and be made to maintain the level of the fuel at a predetermined distance above the level in the tank in accordance with the invention in that case. Moreover, I do not wish to be limited to the details of construction and arrangement of parts shown and described, as such may be variously changed and modified without departing from the spirit and scope of my invention. The pump device is made compact to be passed through the neck 10 and may be readily applied to any standard fuel tank as used on motor cars.

The paddle 18 or arm 17 is made sufficiently heavy to assist in the swinging of the same, which is particularly essential when the tank level is low.

I claim as my invention:

1. The combination with a tank for a motor vehicle and to contain a supply of liquid fuel therefor, of a pressure responsive gauge to be mounted on the vehicle, an inverted cup at the bottom of the tank and open at its lower end to the liquid therein, an air conduit connecting the top of the cup with the gauge, said conduit confining a column of air between the gauge and the liquid in the cup for operating the gauge by the hydrostatic head of the liquid in the tank acting against said air column for indicating the amount of liquid in the tank, an air pump supported in the tank and having a check valve controlled air intake above the maximum level of the liquid in the tank, an air pipe connected with the air intake and opening into the cup above the level of the liquid therein for replenishing the supply of air to the conduit through said cup in the operation of the pump, a paddle pivotally supported in the tank and disposed to be moved back and forth by the wash of the liquid therein, and means connecting the paddle with the pump for operating the same.

2. The combination with a tank for a motor vehicle and to contain a supply of liquid fuel therefor, of a pressure responsive gauge to be mounted on the vehicle, an air conduit connected with the gauge and extending down into the liquid in the tank and open to the same, said conduit serving to confine a column of air between the gauge and the liquid at the lower end of the conduit for operating the gauge by the hydrostatic head of the liquid in the tank acting against said air column for indicating the amount of liquid in the tank, a fixture having check valve controlled air intake and outlet openings, a pump supported in the tank, a pipe connecting the fixture between its openings with the pump and containing a column of liquid surged up and down in the operation of the pump to draw air into said fixture through its inlet and force air out of the fixture through its outlet, a second pipe connecting the air outlet of said fixture with said conduit for replenishing the supply of air thereto in the operation of said pump, and means in the tank and moved by the wash of the liquid therein and connected with the pump for operating the same.

3. The combination with a tank for a motor vehicle and to contain a supply of liquid fuel therefor, of a pressure responsive gauge to be mounted on the vehicle, an inverted cup at the bottom of the tank, an air conduit connecting the gauge with said cup and serving to confine a column of air between the two, a cylinder supported in the tank, a plunger reciprocating in said cylinder through one end and being loose therein so that tank liquid may enter the cylinder ahead of the plunger, a fixture having check controlled air intake and outlet openings, a pipe connecting said fixture between its openings with the end of the cylinder opposite the plunger, an air pipe connecting the outlet of the fixture with the cup, a paddle pivotally supported in the tank and disposed to be moved back and forth by the wash of the liquid therein, and means connecting the paddle with the plunger for operating the same.

In testimony that I claim the foregoing as my invention, I affix my signature, this 19th day of May, 1923.

ELMER RYDER.